Figure 3:
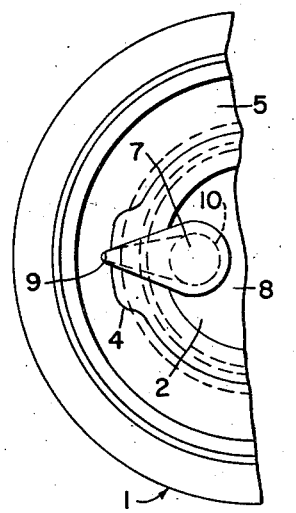

Feb. 5, 1957            A. R. JASUTA            2,780,391
SPOUT COMPRISING A LARGE OUTLET PASSAGE AND A SMALLER
OUTLET PASSAGE LOCATED THEREIN
Filed Sept. 24, 1952

Albert R. Jasuta
*INVENTOR.*

BY *Adams, Forward + McLean*
ATTORNEYS

2,780,391

SPOUT COMPRISING A LARGE OUTLET PASSAGE AND A SMALLER OUTLET PASSAGE LOCATED THEREIN

Albert R. Jasuta, Easton, Pa., assignor to J. T. Baker Chemical Co., Phillipsburg, N. J., a corporation of New Jersey Application September 24, 1952, Serial No. 311,289

2 Claims. (Cl. 222—109)

My invention relates to an improved pouring spout for vessels containing liquids.

Manufacturers are confronted with the problem of supplying spouts for vessels containing liquids which will meet the diverse requirements of consumers. For example, one consumer may desire that a spout suitable for his purposes be designed to deliver liquid in small quantities or drops from a vessel while another may desire a spout that will deliver large quantities of liquid. I have now devised a multiple purpose spout which may be used to pour large quantities of liquid while preventing liquid collecting or running down the outside of the spout or may be used to pour smaller quantities of liquid, e. g., in the form of small drops.

My spout comprises a large outlet passage for pouring large quantities of liquid surrounded by a channel which slopes downwardly to an opening in the wall of the large outlet passage and a smaller outlet passage located within the large outlet passage. The large outlet passage is surrounded by an annular slanting channel designed so that it will receive liquid drippings or overflow from a pouring lip on the large outlet passage which are then drained downwardly to an opening located in the wall opposite the pouring lip, through the opening and back into the interior of the vessel. Thus, any liquid dripping or overflowing from the pouring lip is collected in the drain-back channel and returned to the vessel and thereby any running down of liquid from the outside of the spout is prevented. The smaller outlet passage is located within the large passage and advantageously so that a portion of the wall of the large passage forms a portion of the wall of the smaller passage. Advantageously, the smaller passage is larger at the liquid inlet end than at the outlet end. At the outlet end the smaller passage is curved so that it extends over the pouring lip of the large passage.

Thus, the spout of my invention provides a multiple purpose spout in an integral construction which may be used for pouring large quantities of liquid while preventing undesirable dripping of liquid down the outside of the spout or may be used as a drop flow spout, the spout being easily adapted to either purpose.

The spout of my invention is capable of handling various liquids, but is especially advantageous for handling hydrofluoric acid. The spout may be made of any suitable material, but, if intended for use with hydrofluoric acid, is advantageously molded from polyethylene which is inert to hydrofluoric acid.

Figure 1:
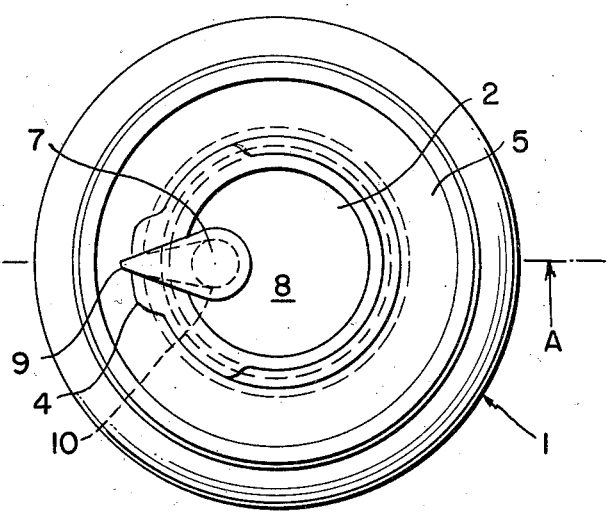
Figure 2:
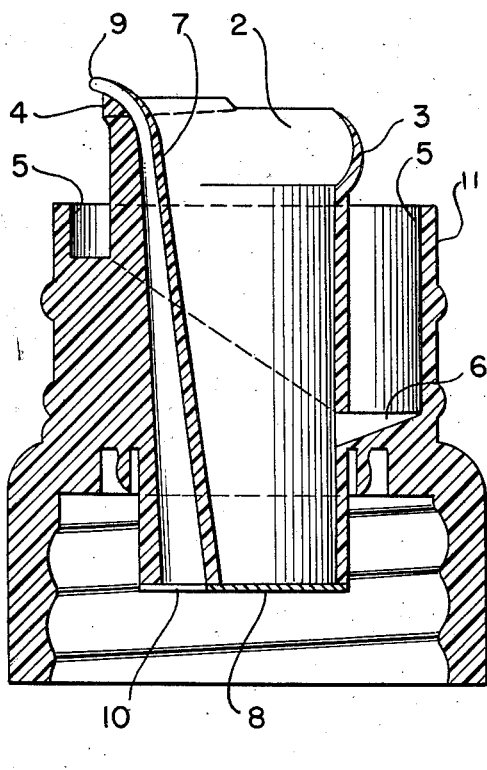
Figure 4:
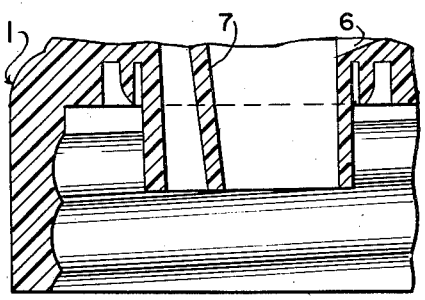

My multiple purpose spout will be further illustrated by reference to the accompanying drawing in which Figure 1 is a top view of my spout, Figure 2 is a sectional view taken at section A—A of Figure 1, Fig. 3 is a fragmentary view of the spout showing the small spout outlet end opened, and Fig. 4 is a fragmentary view of the spout showing the covering for the large passage removed. In the drawing the spout is formed with an internally threaded skirt 1 adapted to fit the neck of a vessel containing liquid. The outlet passage 2 rises from the inside of the skirt. The outlet passage is formed by wall 3 and is provided with a pouring lip 4. A slanting channel 5 is located annularly to the large outlet passage. The shallow portion of the channel is located underneath the pouring lip of the large passage. The passage slants downwardly to an opening 6 in the wall of the large passage. A smaller outlet passage or drop channel 7 is located inside the large passage and preferably so that a portion of the large pasage wall 3 forms a portion of the wall of the drop channel. On the bottom of the large passage is provided a covering 8, for example, a thin membrane, which prevents liquid from entering the large passage. The smaller passage is provided with an elongated curved outlet end 9 which extends over the pouring lip 4 of the large passage. Preferably the drop channel inlet end 10 is larger than the outlet end. Surrounding the slanting channel an externally threaded wall 11 is provided and adapted to receive a closure cap.

As the spout is manufactured, the smaller outlet passage 7 is closed at the outlet end and means 8 are provided at the lower end of the large outlet passage 2 to cover that passage and prevent liquid from entering. If the spout is to be used for pouring large quantities of liquid the covering 8 is removed, for example, by punching it out, and the smaller outlet passage or drop channel 7 is left closed. Thus, when the spout is used for pouring large quantities of liquid, liquid will only be poured from the large outlet passage 2 and by means of the slanting drain-back channel 5 and wall opening 6 drippings and overflow will be collected and returned to the vessel. Figure 4 is a fragmentary sectional view similar to Figure 2 showing the spout with the covering 8 removed. If the spout is to be used as a drop spout the covering 8 of the large outlet passage is left intact and the outlet end 9 of the drop channel 7 is opened. Hence liquid will be poured only from the drop spout 7 as the covering 8 will prevent any liquid from entering the large passage. Figure 3 is a fragmentary top view similar to Figure 1 showing the spout with the drop spout outlet 9 opened. The location of the opening has been exaggerated for purposes of clarity and illustration. Preferably the opening is more forward of that shown. When the drop spout 7 is used there is no difficulty with liquid drippings or overflow down the side of the spout and the drain-back channel 5 is not needed.

I claim:

1. A combination drop and large flow spout for an opening in a vessel containing liquid, which comprises a large outlet passage formed by a passage wall and provided with a pouring lip for pouring liquids, with a slanting channel on the outside of said passage adapted to receive liquid dripping or overflowing from said pouring lip on the said passage, an opening in said passage wall opposite the pouring lip into the low point of the slanting channel, means for covering the bottom of said passage, said means being removable to permit flow of liquid through the passage from the vessel and from the opening into the low point of the slanting channel, a substantially smaller outlet passage for pouring small quantities of liquids formed by a second passage wall situated within and eccentric to the large passage, said smaller passage being larger at the liquid inlet end than at the outlet end, said outlet end being an elongated curved portion extending over the pouring lip of the large passage.

2. A combination drop and large flow spout for an opening in a vessel containing liquid, which comprises a large outlet passage formed by a passage wall and provided with a pouring lip for pouring liquids, with a slanting channel on the outside of said passage adapted to receive liquid dripping or overflowing from said pouring lip on the said passage, an opening in said passage wall opposite the pouring lip into the low point of the slanting channel, means for covering the bottom of said passage, said means being removable to permit flow of liquid through the passage from the vessel and from the opening into the low point of the slanting channel, a substantially smaller outlet passage for pouring small quantities of liquids formed by a second passage wall situated within and eccentric to the large passage so that a portion of the wall of the smaller passage consists of the portion of the wall of the large passage, said smaller passage being larger at the liquid inlet end than at the outlet end, said outlet end being an elongated curved portion extending over the pouring lip of the large passage.

References Cited in the file of this patent

UNITED STATES PATENTS

| | | |
|---|---|---|
| 718,764 | Hutchings | Jan. 20, 1903 |
| 1,779,615 | O'Brien | Oct. 28, 1930 |
| 2,075,848 | Hothersall | Apr. 6, 1937 |
| 2,581,150 | Shore | Jan. 1, 1952 |
| 2,601,039 | Livingstone | June 17, 1952 |